United States Patent [19]
Eberle et al.

[11] 3,761,659
[45] Sept. 25, 1973

[54] DEVICE FOR INDICATING THE LOADING OF VEHICLE SEAT

[75] Inventors: Dieter Eberle, Tamm/Wurttemberg; Dieter Hanselmann; Hans Prohaska, both of Bietigheim/Wurttemberg, all of Germany

[73] Assignee: SWF-Spezialfabrik Fur Autozubehor Gustav Rau GmbH, Bietigheim, Postfach, Germany

[22] Filed: Apr. 27, 1972

[21] Appl. No.: 248,057

[30] Foreign Application Priority Data
Apr. 27, 1971 Germany .................. G 71 16 172.3

[52] U.S. Cl. .............................. 200/85 A, 340/278
[51] Int. Cl. .............................................. H01h 3/14
[58] Field of Search ......... 200/85 R, 85 A, 61.58 B; 340/278; 307/105 B

[56] References Cited
UNITED STATES PATENTS
3,375,495   3/1968   Burns ........................... 200/61.58 B
3,437,993   4/1969   Recio et al ........................ 340/278
3,297,841   1/1967   Campbell ..................... 200/61.58 B Primary Examiner—David Smith, Jr.
Attorney—John J. McGlew et al.

[57] ABSTRACT

A device for indicating a load on a seat such as whether it is occupied by a passenger of a motor vehicle, comprises a seat having an interior spring suspension which flexes downwardly on the load when it is occupied. An indicator pull switch is mounted on a bracket within the interior frame of the seat spring suspension and it includes an actuating member which is engaged by a cable which extends to the spring suspension. The cable is advantageously held under tension produced by a draw spring and it holds the actuating member of the switch in one switch position. When the spring suspension is loaded the tension on the cable is relaxed and the spring actuating member is shifted to another spring position by an internal spring carried by the switch. In another embodiment the cable which is connected to the actuating member is guided through a sleeve guide secured to the spring suspension and its opposite end is looped on an opposite end portion of the seat frame.

8 Claims, 2 Drawing Figures

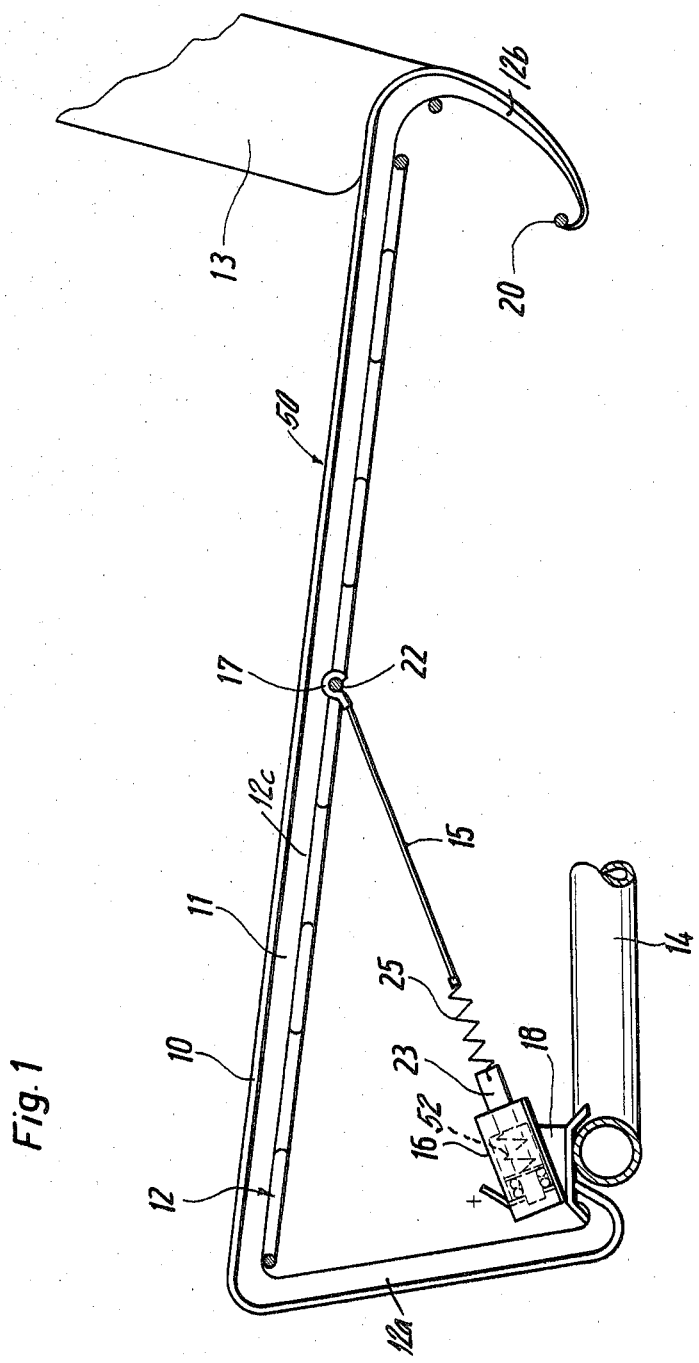

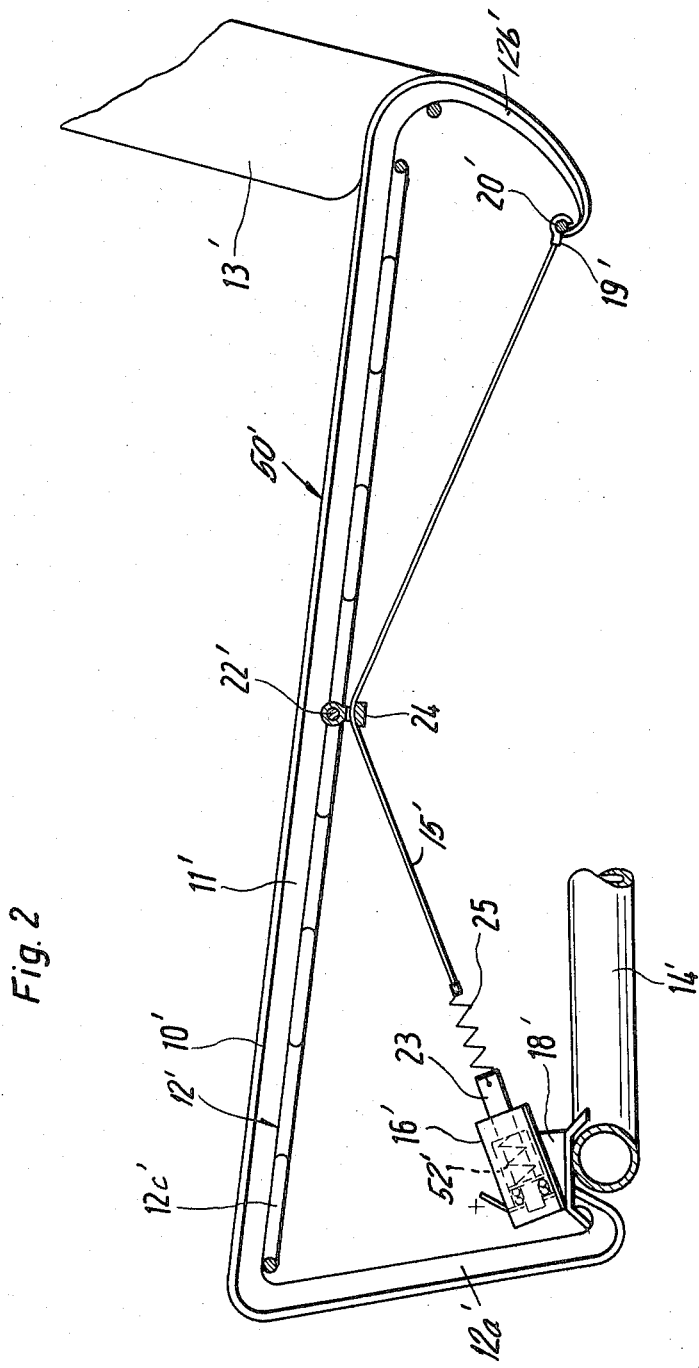

DEVICE FOR INDICATING THE LOADING OF VEHICLE SEAT

BACKGROUND OF THE INVENTION

1. Field of the Invention

This invention relates in general to automobile safety devices and in particular to a new and useful device for indicating the presence of a load on a seat of an automobile vehicle.

2. Description of the Prior Art

In order to increase the safety of persons which are conveyed in vehicles it has been considered advisable to give the driver a signal when a person has occupied a passenger seat and has not fastened his safety belt. In order to produce such a signal it is desirable to have an indicator or actuator which is actuated when the automobile vehicle seat is loaded. The known devices are either complicated in construction or unreliable.

Summary of the Invention

In accordance with the invention the vehicle includes a seat which is constructed as a rigid member which includes a seat frame with a spring suspension supporting the horizontally extending seat part and with downwardly extending leg portions at each end for mounting the seat frame on the floor of the vehicle. The spring suspension, which includes the upholstery and seat covers, is mounted on the seat frame. In accordance with the invention an actuator device in the form of a pull switch is secured to the underside of the seat frame adjacent the forward leg portion and it includes an actuating member oriented toward the spring suspension which is tensioned by a cable connected to the spring suspension into a first switch operating position. The cable is advantageously held under tension by a spring and when the spring suspension is flexed downwardly under loading the tension on the cable is relaxed and the switch actuating member is moved to a second switch operating position by an internal spring of the pull switch construction. After the cable has released the actuating member of the switch the deflection of the seat plays no further part in the operation of the switch and it does not load the operating member of the switch. The initial tension on the cable may be set in such manner that when the seat is only slightly loaded the pull switch is operated and it reliably retains its operative position even when the load and the sagging connection of the cable therewith changes. The pull switch can control a make, break or changeover contact depending on the monitoring circuit which is employed for effecting an indication of the loading of the seat.

The response sensitivity of the device is considerable especially when the cable is connected with the spring suspension of the seat preferably in the central area thereof. In one embodiment the cable is connected to a draw spring which is carried at the end of the actuating member of the pull switch and it is also connected to the spring suspension by means of a hook which engages over one of the rod elements of the suspension. An alternate embodiment gives a comparatively long movement for the pull switch with only slight sagging which is achieved by a construction in which the cable for actuating the actuating member is looped through an eyelet carried on the seat suspension and it is engaged by a hooked end at the opposite leg of the seat. The pull switch is preferably secured to a bracket carried on a base of the front leg portion of the seat and the cable is connected to the back of the spring frame at the base of the rear leg. An intermediate draw spring is interposed between the cable and the actuating member in order to compensate for the length of the cable when the surface of the seat is loaded.

The response of the switch device when the seat is unevenly loaded is improved by the feature that the seat frame and/or spring frame is provided with a plurality of pull switches which are held in the actuated control position by variously extending cables which are connected to the resilient seat spring suspension through each individual pull switch. The pull switches are electrically connected in parallel. Improved operation of the pull switch may be achieved if the actuating member of the pull switch is held in the actuated switch position by a plurality of cables which extend to various locations at the underside of the resilient frame construction of the seat. In each case a comparatively large area of the seat is engaged and a switching operation is triggered each time the surface of the seat sags.

Accordingly it is an object of the invention to provide an improved device for indicating a load on a seat particularly a passenger seat of an automobile and which comprises an indicator pull switch which is adapted to be connected to the underside of a spring suspension and which has an actuating member which is held in an actuating position by a tension cable and which is releasable by movement of the spring suspension with the switch by the loading of the seat to release the tension on the cable.

A further object of the invention is to provide a seat load indicator device which comprises a seat frame, a pull switch supported on the interior of said seat frame having a movable actuating member with means biasing it to a switch position, a tension cable connected to said actuating member and connected to said spring suspension and holding said actuating member in a distinct switch position, said actuating member being movable back to the first position when the seat is loaded.

A further object of the invention is to provide a actuating device for indicating a load on a vehicle seat which is simple in design, rugged in construction and economical to manufacture.

For an understanding of the principles of the invention, reference is made to the following description of typical embodiments thereof as illustrated in the accompanying drawing.

BRIEF DESCRIPTION OF THE DRAWING

In the drawing:

FIG. 1 is a partial longitudinal sectional view of an automobile vehicle seat constructed in accordance with the invention; and FIG. 2 is a view similar to FIG. 1 of another embodiment of the invention.

GENERAL DESCRIPTION OF THE PREFERRED EMBODIMENTS

Referring to the drawings in particular, the invention embodied therein comprises an automobile seat generally designated 50 having a rigid base frame 14 and with a generally U-shaped spring suspension frame generally designated 12 having a front leg portion 12a a rear leg portion 12b and an intermediate horizontal portion 12c. The spring suspension 12 comprises a grid composed of individual spring rods or bars 22 which is covered by a seat cover 10 and by upholstery 11. A rear portion 13 of the seat extends upwardly from the leg 12b.

In accordance with the invention a load is indicated by the flexure or sagging of a spring suspension 12 and this is effected by means of a pull switch generally designated 16 having an actuator member 23 formed as an eyelet which is held in one operating position, for example an actuated position, by a holding cable 15, but which may be returned to an opposite operating position, that is for example, a deactuated position, by a return spring 52 of the switch 16.

Means are provided for applying a tension to the cable 15, which in the embodiment shown comprises a draw spring 25 and a hook 17 at the opposite end of the cable which is hooked over the spring suspension at the rod portion 22. The cable 15 is of a length such that when the spring suspension 12 is unloaded the cable 15 is maintained under tension and an expansion pressure is applied on the spring 25 to hold the actuating member 23 in a first switch position. When the spring suspension 12 is loaded and the spring sags downwardly the tension on the cable 15 is relaxed to permit the spring 52 to return the actuating member to a second switch position.

When the surface of the seat is loaded it sags downwardly and the cable 15 is relieved and this permits the actuating member 23 to move to the left as shown in the drawings. Draw spring 25 compensates for the length of a relief cable 15. The downward sagging of the surface of the seat no longer influences the operation of the pull switch 16 after it is once moved into the second switch position. Only a slight sagging of the seat will produce the necessary short control movement of the pull switch 16. Severe sagging movements of the seating surface do not load the switch actuating member 23 because the cable 15 is relieved during the downward sagging or loading of the seat.

In the embodiment shown in FIG. 2 similar parts are similarly designated but with primes. In this construction a guide member 24 in the form of a eyelet is engaged over a rod portion 22' and a cable 15' which is connected at one end to the draw spring 25' is connected through the eyelet guide member 24 and its opposite end is provided with a hook 19' which is engaged over a wire rod element 20' of the spring suspension 12'. With this construction the sagging of the seat may cause a long operating movement of the actuating member 23 of the pull switch 16 and even if the sagging is only slight. Reliable operation of the pull switch is achieved in this manner even with only slight loading of the seat.

Instead of only one cable 15 or 15' a plurality of cables may be employed with either one or more switches. When a plurality of switches are located at diverse locations within the seat frame each of the switches are connected in parallel electrically. In each case a comparatively large portion of the surface of the seat is used for operating the pull switch or the pull switches.

While specific embodiments of the invention have been shown and described in detail to illustrate the application of the principles of the invention, it will be understood that the invention may be embodied otherwise without departing from such principles.

What is claimed is:

1. A device for indicating a load on a seat, particularly a passenger seat of an automobile, comprising a seat having an interior spring suspension, an indicator switch mounted adjacent said interior spring suspension and having an actuating member, means biasing said actuating member to one switch position, a cable connected to said actuating member, and tensioning means for biasing said cable in a direction opposite to said biasing means to urge said actuating member to a second switch position when said spring suspension is unloaded and to permit said biasing means to shift said actuating member back to said one position when said seat is loaded and said spring suspension sags in a direction toward said actuating member, said seat including a frame having a front leg portion and a rear leg portion being arranged in spaced relationship and extending generally vertically with an intermediate horizontal seat portion extending therebetween, said cable being connected to said intermediate horizontal seat portion, means mounting said switch adjacent said front leg of said seat within said frame in a fixed position.

2. A switch device according to claim 1, wherein said cable is connected to the center of said seat spring suspension.

3. A switch according to claim 1, wherein said cable is provided with a hook, said spring suspension including spring bar elements one of which is engaged by said hook.

4. A switch device according to claim 1, wherein said tensioning means comprises a guide member secured to said spring suspension, said cable being looped through said guide member and having an end connected to said seat frame.

5. A switch device according to claim 1, wherein said tensioning means includes a draw spring connected between said cable and said actuating member.

6. A switch according to claim 1, wherein said biasing means comprises a return spring of said switch.

7. A device according to claim 1 including a plurality of pull switches located at spaced locations along said seat frame each of said switches having an actuating member and a cable connected to said actuating member toward said actuator to a second switch position when said spring suspension is not loaded.

8. A device for indicating a load on a seat, particularly a passenger seat of an automobile, comprising a seat having an interior spring suspension with a top substantially horizontal flexible spring seat portion with front and rear downwardly extending seat leg portions, an indicator switch mounted adjacent the lower end of one of said leg portions of said interior spring suspension and having an actuating member, an adjustment spring biasing said actuating member to one switch position, a cable connected at one end to said actuating member and having an opposite end connected to said top horizontal seat portion in the middle thereof and a draw spring connected between said actuating member and said cable and acting in a direction opposite to said biasing means to urge said actuating member to a second switch position when said spring suspension is unloaded and to permit said biasing means to shift said actuating member back to said one position when said seat is loaded and said spring suspension sags in a direction toward said actuating member.

* * * * *